United States Patent [19]

Frohbach

[11] Patent Number: 4,613,759

[45] Date of Patent: Sep. 23, 1986

[54] SMALL PHOTOELECTRIC READING APPARATUS

[75] Inventor: Hugh F. Frohbach, Sunnyvale, Calif.

[73] Assignee: Nippon Kogaku K.K., Tokyo, Japan

[21] Appl. No.: 616,699

[22] Filed: Jun. 4, 1984

[51] Int. Cl.[4] .............................................. G06K 7/10
[52] U.S. Cl. .................................... 250/566; 235/463
[58] Field of Search ............... 250/566, 555, 568, 569; 235/463

[56]  References Cited
U.S. PATENT DOCUMENTS 4,074,114  2/1978  Dobras ................................ 250/566

Primary Examiner—Gene Wan
Attorney, Agent, or Firm—Shapiro and Shapiro

[57] ABSTRACT

A photoelectric reading apparatus comprises a linear image sensor, an optical system for causing characters or figures on the surface of paper such as an original to be imaged on the light-receiving surface of the linear image sensor, index mark means for indicating the area of the surface of the paper to be recorded to adjust such area, and a circuit for reading, of output signals produced by the linear image sensor, a signal corresponding to the area indicated by the index mark means.

5 Claims, 8 Drawing Figures

SMALL PHOTOELECTRIC READING APPARATUS

BACKGROUND OF THE INVENTION

1. Field of the Invention

This invention relates to a photoelectric reading apparatus represented by a copying apparatus for leaving records as by copying originals.

2. Description of the Prior Art

Document preparation occupies the main position in office work and there is a very strong need for its rationalization and saving of the energy required for it. As the conventional technique for meeting such need, there are typewriters copying apparatuses, facsimiles, etc., but there is a limit in the office work utilizing these and a sufficient effect cannot be obtained therefrom.

For example, the work of picking out desired parts of a book or literature and preparing the summary thereof or taking out key words and making them into the form of cards has become more and more important with the progress of the information age. However, there is no simple means for accomplishing this, except the work of copying desired pages and editing only necessary parts. At any rate, copies are often wasted and the editing requires much labor and time. Also, when it is desired to typewrite desired information, if the information is written in the Japanese language, Japanese typewriters are not easy for common clerks to use freely.

SUMMARY OF THE INVENTION

It is an object of the present invention to provide a small photoelectric reading apparatus capable of recording necessary parts of originals or the like.

The apparatus of the present invention comprises a linear image sensor, an optical system for causing characters or figures on the surface of paper such as an original to be imaged on the light-receiving surface of the linear image sensor, index mark means for indicating the area of the surface of the paper to be recorded to adjust such area, and a circuit for reading, of output signals produced by the linear image sensor, a signal corresponding to the area indicated by the index mark means.

As a mode of the present invention, the output signals of the linear image sensor read by the reading circuit are printed on paper by a printer.

As another mode of the present invention, the output signals of the linear image sensor read by the reading circuit are recorded on a magnetic tape or a magnetic disk by a recorder.

The invention will become more fully apparent from the following detailed description thereof taken in conjunction with the accompanying drawings.

DESCRIPTION OF THE PREFERRED EMBODIMENTS

Figure 1:
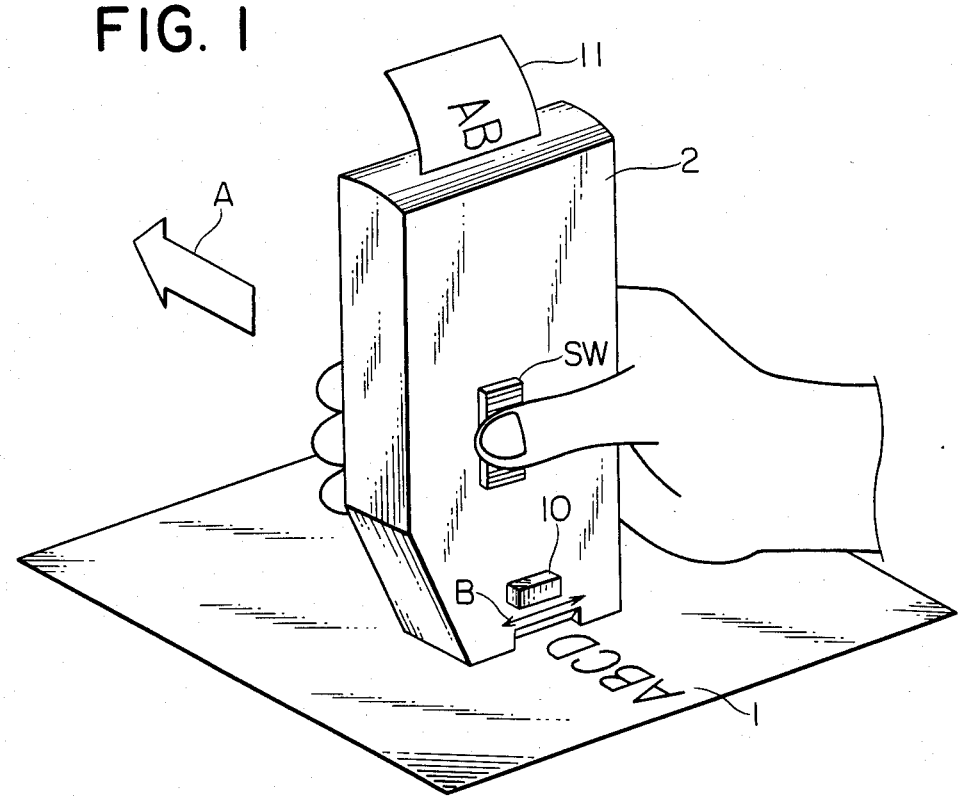
FIG. 1 is a perspective view showing the appearance of the apparatus of the present invention.

FIG. 1 is a perspective view showing the apparatus of the present invention and the operation of the apparatus. The apparatus of the present invention, as will later be described, comprises a solid state image pickup device comprising charge accumulating type photoelectric conversion elements arranged in a one-dimensional direction, an optical system for causing the image of a predetermined area of an original to be formed on the light-receiving surfaces of the photoelectric conversion elements, a device for detecting a predetermined area of the original or the like by the solid state image pickup device and making an image signal (the aforedescribed operation of the solid state image pickup device will hereinafter be referred to as the vertical scanning), and a device for effecting printing in response to the image signal. When this apparatus is to be actually operated, the apparatus is manually slidden on the original or moved with the aid of a roller driven by a motor or the like so that the image of the original passed through the optical system is moved in a direction orthogonal to the direction of arrangement of the photoelectric conversion elements (hereinafter referred to as the horizontal scanning). In FIG. 1, the solid state image pickup device and the printer are integral with each other, but alternatively, these may be discrete from each other.

The apparatus of the present invention prints a copy of the original on paper 11 on the basis of the image signal obtained by the vertical scanning of a linear image sensor comprising a charge coupled device (hereinafter referred to as the CCD) and photodiodes arranged in a row and the horizontal scanning effected relative to the surface of the original by the operator's hand. A push button switch SW may drive the linear image sensor incorporated in the body 2, a circuit for making the image signal and a controlling circuit (to be described) for controlling the operation of the printer. A knob 10 adjusts the area of the vertical scanning (hereinafter referred to as the reading width) of the linear image sensor by being moved in the direction of arrow B and as a result, the width in the vertical scanning direction in which the printer to be described prints on the paper 11 varies.

Figure 2:
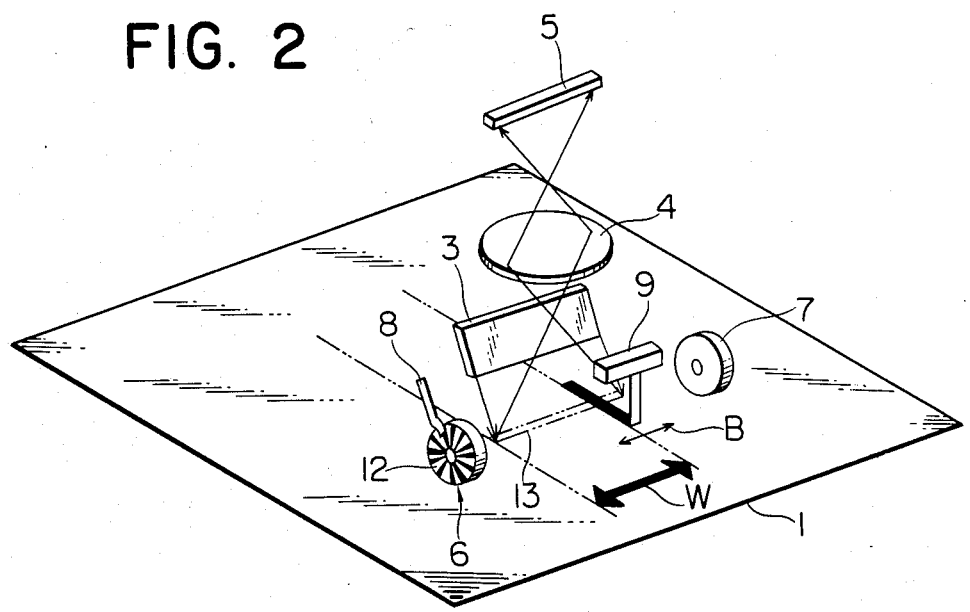
FIG. 2 is a perspective view showing the optical system of the apparatus of the present invention.

FIG. 2 is a perspective view showing the interior of the body of the apparatus of the present invention in FIG. 1 with some parts thereof omitted. The original surface 1 is illuminated by an LED array 3 through a slit-like opening 13 provided in the outer case of the body 2. The image of the original surface 1 passed through the slit-like opening 13 is formed on a linear image sensor 5 by an imaging lens 4 and converted into an electrical signal. That is, the original surface 1 and the light-receiving surface of the linear image sensor 5 are in a conjugate relation. Rollers 6 and 7 determine the optical relative position of the original surface and the body 2 and also serve as guide wheels when the horizontal scanning of the body 2 relative to the original surface 1 by the operator's hand is effected. Conductor foil 12 is formed on one side surface of the roller 6 radially thereof, and the conductor foil 12 and brush 8 together form an encoder for detecting the amount of movement of the body 2. Above the aforementioned slit-like opening 13 provided in the outer case of the body 2, an index mark 9 indicating the reading width is disposed at such a position that the image of a part of the index mark is projected onto the linear image sensor 5, and this index mark 9 is designed to be manually moved in the vertical scanning direction indicated by arrow B with the aid of the knob 10. Arrow W indicates the reading width set by the index mark 9. The upper surface of the index mark 9 is colored in black and has a reflection factor sufficiently smaller than the white level of the original.

Figure 3:
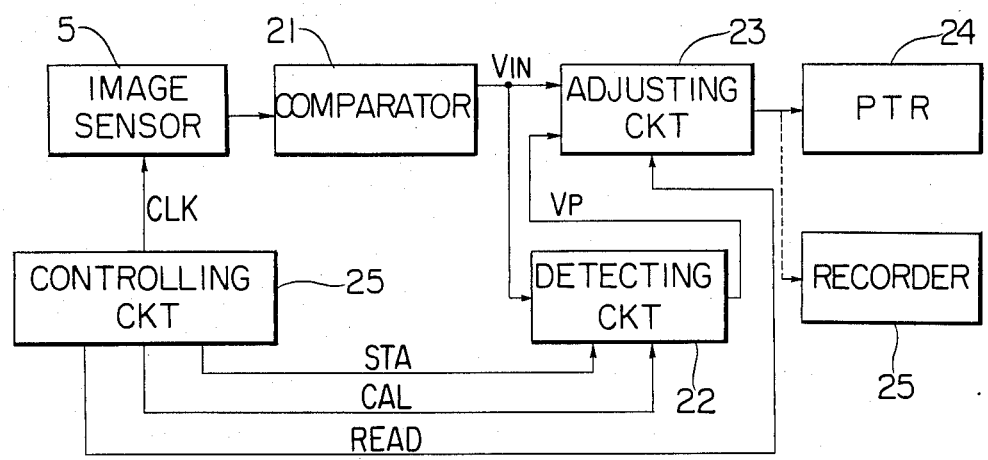
FIG. 3 is a block diagram illustrating an embodiment of the circuit of the present invention.

FIG. 3 is a block diagram of the electric circuit of an embodiment of the present invention. The linear image sensor 5 serially produces a signal proportional to the intensity of light detected by a plurality of photodiodes in response to the clock signal CLK from a controlling circuit 25. A comparator 21 compares the output from the image sensor 5 with a reference value and produces an output $V_{IN}$. The output $V_{IN}$ is at a high level when the output of the image sensor is higher than the reference value, and is at a low level when the output of the image sensor is lower than the reference value. A reading width detecting circuit 22 detects and stores the position of the index mark 9 in the vertical scanning direction on the basis of the output signal from the image sensor 5. The detecting circuit 22 produces an output $V_P$ indicative of the position of the index mark 9, and a reading width adjusting circuit 23 adjusts, on the basis of the output $V_P$, the period during which the output $V_{IN}$ from the image sensor through the comparator 21 is read, and produces the read output $V_{IN}$ as an output $V_O$ toward a printer 24 or a recorder 25 for recording on a magnetic tape or a magnetic disk. The controlling circuit 25 starts driving in response to the closing operation of the switch SW and produces the clock signal CLK to the image sensor 5 and a signal for controlling the driving of the detecting circuit 22 and the adjusting circuit 23, on the basis of the output from the encoder comprising the conductor foil 12 of the roller 6 and the brush 8 shown in FIG. 2. The output of the image sensor 5 passed through the comparator 21 assumes a high level when the original surface is white, and assumes a low level when the original surface is black.

Figure 4:
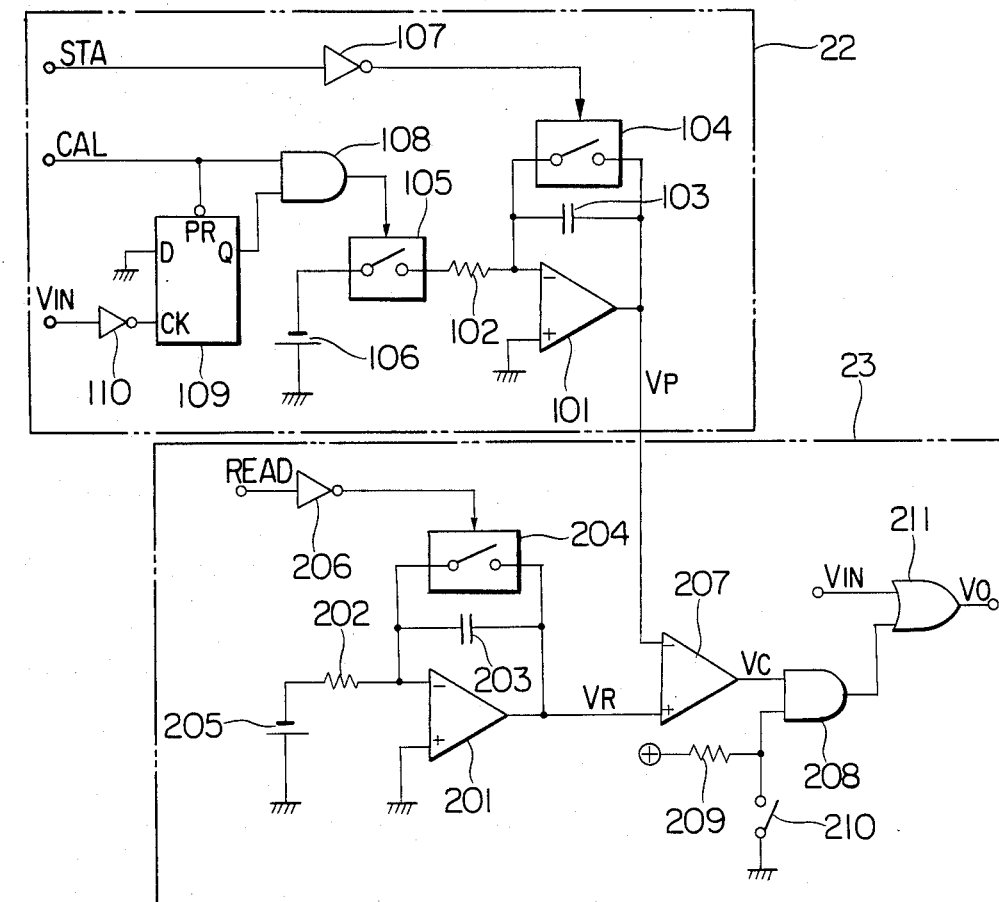
FIG. 4 is a detailed circuit diagram of a portion of the block diagram of FIG. 3.

FIG. 4 shows an example of the electric circuitry of the reading width detecting circuit 22 and the reading width adjusting circuit 23 of FIG. 3. An operational amplifier 101, a resistor 102 and a capacitor 103 together constitute an integrating circuit. This integrating circuit is controlled by analog switches 104 and 105 and creates a voltage $V_P$ increasing with time at a rate determined by the voltage of a power source 106, the resistance value of the resistor 102 and the capacitor 103. The analog switch 104 is controlled by the signal STA from the controlling circuit 25 passed through an inverter 107 and is rendered non-conductive when the output of the inverter 107 is at a low level (hereinafter referred to as L level), and is rendered conductive when the output of the inverter 107 is at a high level (hereinafter referred to as H level), and the analog switch 105 is controlled by an AND gate 108 and is rendered non-conductive when the output of the AND gate 108 is at L level, and is rendered conductive when the output of the AND gate 108 is at H level. A signal CAL produced by the controlling circuit 25 is applied to one input of the AND gate 108, and the output signal of a D flip-flop circuit 109 is applied to the other input of the AND gate 108.

Figure 5:
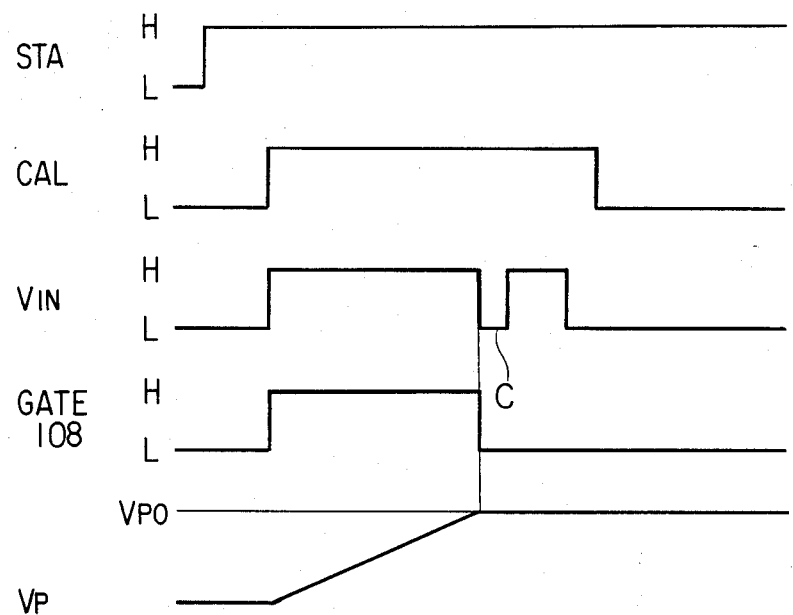
FIGS. 5 and 6 are time charts showing the operation of the circuit of FIG. 4.

The D terminal of the D flip-flop 109 is connected to the ground level of the power source, and the output signal $V_{IN}$ of the comparator 21 is applied to the clock input terminal CK of the D flip-flop 109 through an inverter 110. Also, the signal CAL is applied to the preset terminal PR of the D flip-flop 109. Now, the body 2 is placed so that the rollers 6 and 7 and the opening 13 overlie the white portion of the original, and the index mark 9 is moved by the knob 10 to set the reading width arbitrarily. Operation will hereinafter be described on the basis of the time chart of FIG. 5. When the push button SW of FIG. 1 is depressed, a start signal STA is produced by the controlling circuit 25. This signal maintains H level from after one manual horizontal scanning has been completed until the finger is released from the push button SW. The analog switch 104 is rendered non-conductive by the start signal STA and the preparation for the integrating operation is completed, but the integrating operation is not yet started because the analog switch 105 still remains non-conductive. Then, the signal CAL of the reading width detecting circuit 22 changes from L level to H level. This signal is applied to the AND gate 108, and by this time, the other input of the AND gate 108 has already assumed H level because the D flip-flop 109 has already been preset when the signal CAL is at L level. Accordingly, the output of the AND gate 108 assumes H level in response to the signal CAL assuming H level and the analog switch 105 conducts and therefore, the integrating operation is started and the output $V_P$ increases with time. The vertical scanning by the image sensor 5 is started in synchronism with the start of the integrating operation, and the output signal thereof is applied to the clock terminal CK of the flip-flop 109 through the comparator 21 and the inverter 110. The original is only white at first and therefore, the output $V_{IN}$ continues to assume H level, but when the scanning progresses to point at which the image of the index mark 9 is read, the output $V_{IN}$ drops to L level as shown in FIG. 5C because the index mark 9 is colored in black as previously mentioned. Thereupon, the clock terminal CK of the D flip-flop 109 rises to H level and therefore, the output terminal Q of this flip-flop changes from H level to L level. Accordingly, the output GATE of the AND gate 108 also assumes L level and the analog switch 105 becomes non-conductive and thus, the integrating operation is stopped. The signal CAL again assumes L level after a time somewhat longer than one major scanning of $V_{IN}$, while the output of the AND gate 108 remains at L level and therefore, the value $V_{PO}$ of the output $V_P$ is maintained as it is. This output $V_{PO}$ is a value proportional to the reading width set by the index mark 9.

Description will now be made of an example of the electric circuitry of the reading width adjusting circuit 23. An operational amplifier 201, a resistor 202 and a capacitor 203 together constitute an integrating circuit, which creates a voltage $V_R$ linearly increasing at a rate determined by the voltage of a voltage source 205, the resistance value of the resistor 202 and the capacity of the capacitor 203. This integrating circuit is controlled by an analog switch 204, which in turn is controlled by the signal READ from the controlling circuit 25 through an inverter 206. The controlling circuit 25 detects that a predetermined amount of horizontal scanning has been effected on the basis of the output from the encoder indicative of the amount of movement by the horizontal scanning, and produces signals CLK and READ each time the predetermined amount of horizontal scanning is effected. The output signal $V_R$ of the integrating circuit is applied as an input to a comparison circuit 207, where it is compared with the output voltage $V_P$ of the aforementioned reading width detecting circuit 22. The result of this comparison is input to an AND gate 208. A resistor 209 is connected between the other input of the AND gate 208 and the positive terminal of the power source, and a switch 210 is connected between the other input of the AND gate 208 and the ground level. This switch 210 is the disable switch of the reading width adjusting circuit 23, and this switch may be closed when it is desired to effect scanning over the entire width in the vertical scanning of the linear image sensor irrespective of the position of the index mark.

This switch 210 is useful where there is no white portion over the entire width of the original surface when, for example, reading of the entire area of the vertical scanning is desired. That is, by operating the switch 210 to bring one input of the AND gate 208 into L level, there is brought about a condition in which the entire width of the vertical scanning is read.

The output of the AND gate 208 is applied to an OR gate 211. The output signal $V_{IN}$ of the comparator 21 is applied to the other input terminal of this OR gate 211, and the output $V_O$ of the OR gate 211 is supplied as the output of the reading width adjusting circuit 23 to the printer 24.

Figure 6:
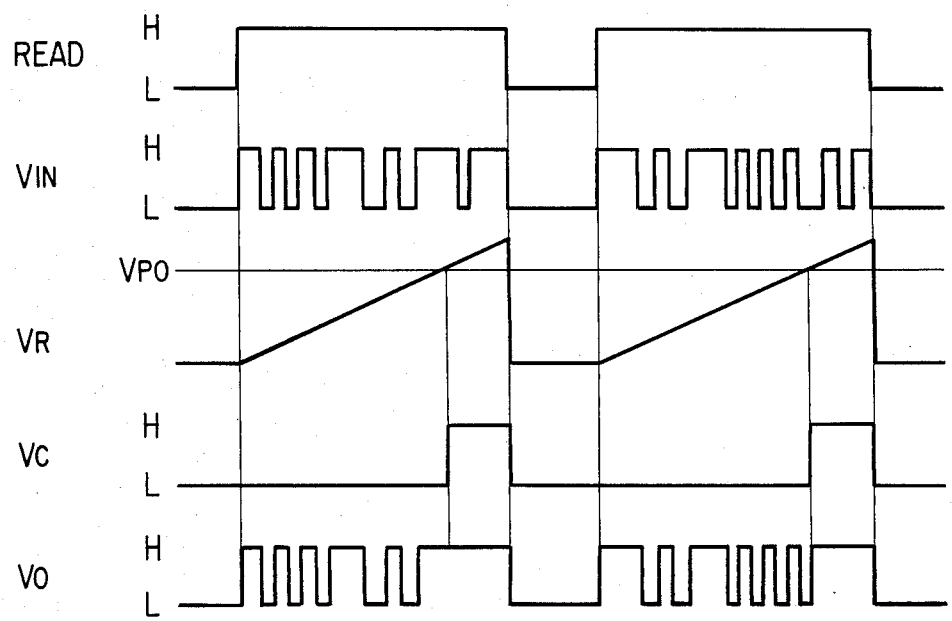

Operation of the adjusting circuit 23 will hereinafter be described on the basis of the time chart of FIG. 6. When the present apparatus is manually moved in the horizontal scanning direction to start scanning as shown in FIG. 1, the signal READ which assumes H level as long as the output signal of the image sensor 5 is produced is supplied to the analog switch 204 through the inverter 206 each time the vertical scanning by the image sensor 5 is effected. During that time, the integrating circuit operates and therefore, the output signal $V_R$ provides a saw-tooth-like signal as shown in FIG. 6. If, at this time, it is desired to effect the vertical scanning of the image sensor 5 at the same clock rate as that when $V_{PO}$ was determined by the aforementioned reading width detecting circuit 22, each circuit constant must be predetermined so that the output voltage curve of the integrating circuit constituted by the operational amplifier 201, the resistor 202 and the capacitor 203 is coincident with that of the aforementioned integrating circuit constituted by the operational amplifier 101, the resistor 102 and the capacitor 103. This output voltage $V_R$ is compared with $V_{PO}$ by the comparison circuit 207 and, when $V_R > V_{PO}$, the output voltage $V_C$ of the comparison circuit 207 assumes H level. The switch 210 is normally open and therefore, this voltage is intactly applied to the OR gate 211 and the output $V_O$ thereof assumes H level irrespective of the value of $V_{IN}$. Accordingly, during the period when $V_R < V_{PO}$ for each vertical scanning, $V_{IN}$ intactly provides $V_O$ and, when $V_R > V_{PO}$, $V_O$ assumes H level and therefore, only during the period when $V_R < V_{PO}$, that is, only during the period corresponding to the reading width determined by the index mark 9, $V_{IN}$ is applied to the printer 24 and thereafter, $V_{IN}$ assumes H level and therefore, it becomes possible to set an arbitrary reading width thereby and print only that portion.

Figure 7:
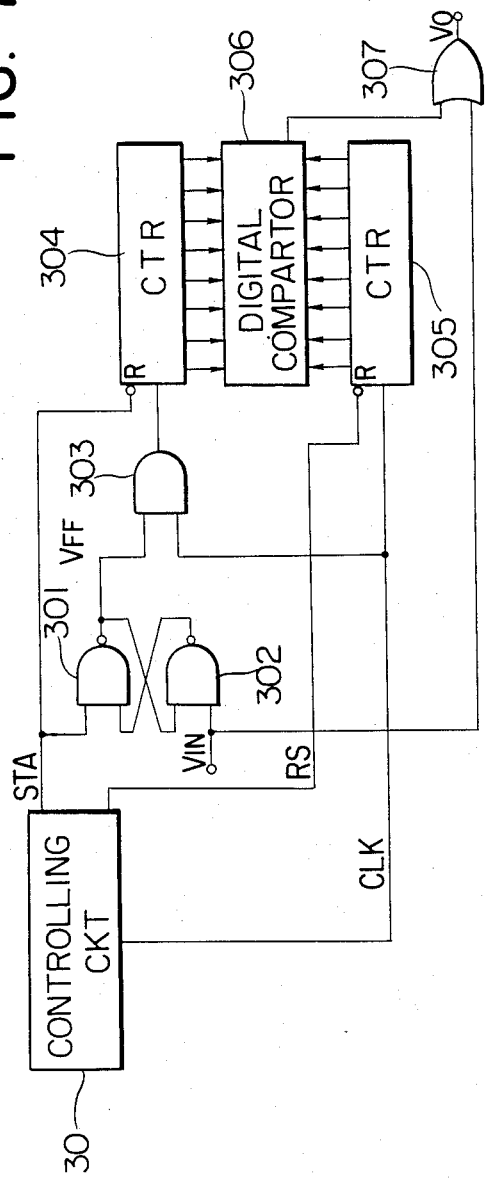
FIG. 7 is a partly detailed circuit diagram showing another embodiment of the circuit of the present invention.
Figure 8:
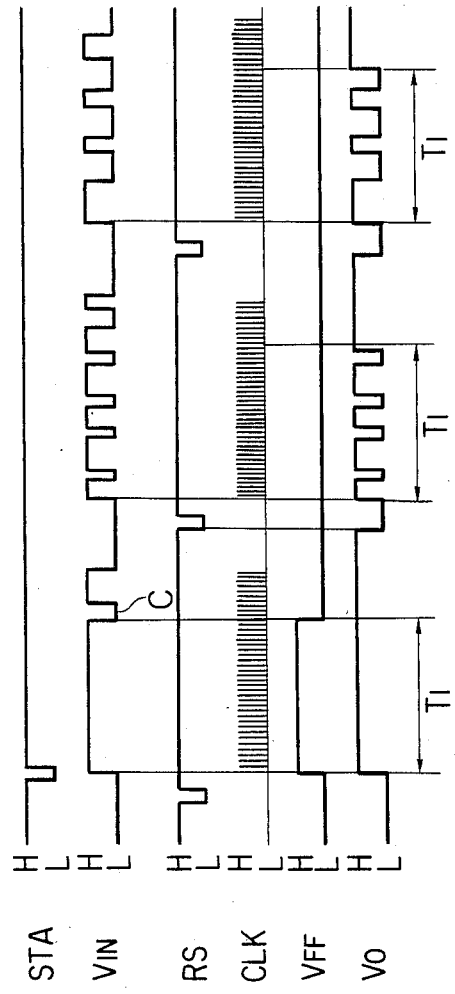
FIG. 8 is a time chart showing the operation of the circuit of FIG. 7.

FIG. 7 is a circuit diagram showing the controlling circuit, the reading width detecting circuit and the reading width adjusting circuit in another embodiment of the present invention. The image sensor 5, the comparator 21 and the printer 24 are similar to those in the previous embodiment and therefore are not shown. In the embodiment of FIG. 7, the circuit except the controlling circuit 30 and the OR gate 307 is the reading width detecting circuit, and the OR gate 307 is the reading width adjusting circuit. NAND gates 301 and 302 together constitute an RS flip-flop, and the start pulse STA from the controlling circuit 30 is applied to one input of the RS flip-flop and the output $V_{IN}$ of the comparator 21 is applied to the other input of the RS flip-flop. The output $V_{FF}$ of this flip-flop is connected to one input of an AND gate 303 and a clock pulse CLK used for the scanning of the image sensor 5 is applied to the other input of the AND gate 303. The output of the AND gate 303 is applied to a counter 304. This counter 304 is reset by the start pulse STA. The clock pulse CLK is also applied to another counter 305, which is reset by a reset pulse RS put out immediately before each vertical scanning (FIG. 8). This reset pulse may also be a pulse used as the transfer signal of the sensor 5. The contents of the two counters 304 and 305 are compared by a digital comparator 306 and, when the count number of the counter 305 is greater than or equal to that of the counter 304, the output of the digital comparator 306 assumes H level, and when the count number of the counter 305 is smaller than that of the counter 304, the output of the digital comparator 306 assumes L level. The output of this digital comparator 306 is applied to one input of the OR gate 307 and the output $V_{IN}$ of the comparator 21 is applied to the other input of the OR gate 307. The controlling circuit 30, like the previously described controlling circuit 25, causes the encoder to detect the amount of movement in the horizontal scanning direction and produces pulses RS and CLK for each predetermined amount of movement.

Operation of the circuit of FIG. 7 will hereinafter be described on the basis of the time chart of FIG. 8. Now, as described in connection with the previous embodiment, the body 2 is placed on the white portion of the surface 1 of the original as shown in FIG. 1 and the index mark 9 is moved by the knob 10 to set the reading width arbitrarily. When the push button SW is then depressed, a start pulse STA is generated by the controlling circuit 30 (FIG. 8). Thereupon, an RS flip-flop constituted by NOR gates 301 and 302 is set and the output $V_{FF}$ thereof assumes H level. On the other hand, the counter 304 is reset by the pulse STA and the content thereof becomes 0. Thus, a clock pulse CLK to the sensor 5 is generated and this is applied to the counter 305 as shown in FIG. 8 and is also applied to the counter 304 through the AND gate 303. Simultaneously therewith, an output $V_{IN}$ is generated from the comparator 21, but at this time, the original detected by the image sensor 5 is all white and therefore, an H level signal comes continuously. When the scanning progresses to a point at which the index mark 9 is read, the output $V_{IN}$ assumes L level as shown in FIG. 8, and the RS flip-flop is reset and the output $V_{FF}$ thereof assumes L level and thus, the AND gate 303 prevents the clock pulse CLK from being counted by the counter 304. Accordingly, the number of clock pulses corresponding to the period $T_1$ from the start of the scanning until the index mark 9 is read is counted and stored in the counter 304. When the body 2 is then manually moved in the horizontal scanning direction, the clock pulse CLK is repetitively put out and the image information of the original is repetitively read by the sensor 5, but the counter 305 is reset by the reset pulse RS as shown in FIG. 8 each time the image information of the original is read by the sensor 5, whereafter the counter 305 counts the number of clock pulses CLK. When the count number thereof becomes coincident with the number stored in the counter 304, the output of the digital comparator 306 assumes H level. Till then, the output $V_O$ of the OR gate 307 has been the same as $V_{IN}$ as shown in FIG. 8, but when the output of the digital comparator 306 assumes H level, the output $V_O$ assumes H level. Accordingly, as long as the output $V_O$ is at H level, the printer, not shown, judges the original as a white portion and does not print the characters or the like actually lying on the surface of the original.

The digital comparator 306 may be designed to put out a pulse only when the contents of the counters 304 and 305 become coincident with each other, thereby inverting the flip-flop instead of the OR gate 307 and then resetting the flip-flop when the reset pulse RS has come thereinto.

As an alternative construction, the content of the counter 304 may be shifted to the counter 305 by the use of the parallel input of the counter 305 at the reset pulse RS immediately before each vertical scanning and this may be counted down by the clock pulse CLK, whereby the flip-flop instead of the OR gate 307 may be inverted at a point whereat the content of the counter 305 becomes 0.

I claim:

1. An apparatus for optically detecting an object, including:
   (a) an optical system for imaging said object on a predetermined surface;
   (b) photoelectric converting means including a linear image sensor having a band-like light-receiving surface extending in one direction, said light-receiving surface being disposed so as to be substantially coincident with said predetermined surface, said linear image sensor producing an output signal corresponding to the intensity distribution of light on said light-receiving surface;
   (c) index mark means for forming a predetermined image on said light-receiving surface;
   (d) displacing means for imparting relative displacement between a detected area extending in one direction of said object conjugate with said light-receiving surface through said optical system and said object in a direction substantially orthogonal to the direction in which said detected area extends;
   (e) means for detecting the position of said predetermined image on said light-receiving surface on the basis of the output signal from said linear image sensor and producing a detection signal prior to the displacement being imparted between said detected area and said object;
   (f) means for setting an arbitrary area on said light-receiving surface on the basis of said detection signal; and
   (g) means for reading the output signal from said linear image sensor in response to the displacement between said detected area and said object, said means reading a part of the output signal from said linear image sensor which corresponds to said set arbitrary area.

2. An apparatus according to claim 1, wherein said photoelectric converting means causes the output signal from said linear image sensor to be serially produced, said setting means includes means for producing a stop signal in response to said linear image sensor producing the output signal corresponding to the position of said predetermined image on said light-receiving surface, and said reading means stops the reading of the output signal from said linear image sensor in response to said stop signal.

3. An apparatus according to claim 1, wherein said index mark means includes a member provided in the optical path by said optical system leading from said object to said light-receiving surface, and said member forms said predetermined image on said light-receiving surface through said optical system.

4. An apparatus for optically detecting an object, including:
   (a) an optical system for imaging said object on a predetermined surface;
   (b) photoelectric converting means including a linear image sensor having a band-like light-receiving surface extending in one direction, said light-receiving surface being disposed so as to be substantially coincident with said predetermined surface, said linear image sensor producing an output signal corresponding to the intensity distribution of light on said light-receiving surface;
   (c) index mark means for forming a predetermined image on said light-receiving surface;
   (d) means for detecting the position of said predetermined image on said light-receiving surface on the basis of the output signal from said linear image sensor and producing a detection signal;
   (e) means for setting an arbitrary area on said light-receiving surface on the basis of said detection signal; and
   (f) means for reading the output signal from said linear image sensor, said means reading a part of the output signal from said linear image sensor which corresponds to said set arbitrary area.

5. An apparatus for optically detecting an object, including:
   (a) an optical system for imaging said object on a predetermined surface;
   (b) photoelectric converting means including a linear image sensor having a band-like light-receiving surface extending in one direction, said light-receiving surface being disposed so as to be substantially coincident with said predetermined surface, said linear image sensor producing an output signal corresponding to the intensity distribution of light on said light-receiving surface;
   (c) index mark means for forming a predetermined image on said light-receiving surface;
   (d) housing means for housing said optical system, said photoelectric converting means and said index mark means, said housing means being of a shape capable of being held in a hand;
   (e) displacing means for imparting relative displacement between a detected area extending in one direction of said object conjugate with said light-receiving surface through said optical system and said object in a direction substantially orthogonal to the direction in which said detected area extends, said displacing means producing an output signal each time it is relatively displaced by a predetermined amount between said detected area and said object;
   (f) means for detecting the position of said predetermined image on said light-receiving surface on the basis of the output signal from said linear image sensor and producing a detection signal prior to the displacement being imparted between said detected area and said object;

(g) means for setting an arbitrary area on said light-receiving surface on the basis of said detection signal; and (h) means for reading the output signal from said linear image sensor in response to the output signal of said displacing means, said means reading a part of the output signal from said linear image sensor which corresponds to said set arbitrary area.

* * * * *